(12) United States Patent
Lu et al.

(10) Patent No.: US 12,537,045 B2
(45) Date of Patent: Jan. 27, 2026

(54) PROACTIVE USAGE-BASED DISTURBANCE MITIGATION BASED ON RESOURCE AVAILABILITY

(71) Applicant: Micron Technology, Inc., Boise, ID (US)

(72) Inventors: Yang Lu, Boise, ID (US); Yuan He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 113 days.

(21) Appl. No.: 18/635,739

(22) Filed: Apr. 15, 2024

(65) Prior Publication Data

US 2024/0379147 A1 Nov. 14, 2024

Related U.S. Application Data

(60) Provisional application No. 63/501,774, filed on May 12, 2023.

(51) Int. Cl.
*G11C 11/00* (2006.01)
*G11C 11/4078* (2006.01)
(Continued)

(52) U.S. Cl.
CPC ...... *G11C 11/4078* (2013.01); *G11C 11/4093* (2013.01); *G11C 11/4096* (2013.01)

(58) Field of Classification Search
CPC ............ G11C 11/4085; G11C 11/4087; G11C 11/406; G11C 11/40611; G11C 11/4093; G11C 11/40603; G11C 2029/4402; G11C 29/02; G11C 29/52; G11C 11/4078; G11C 29/42; G11C 29/4401; G11C 11/221; G11C 11/40622; G11C 11/408; G11C 2029/0409; G11C 2029/1202; G11C 2029/1204; G11C 29/025; G11C 29/10; G11C 29/1201; G11C 29/20; G11C 29/38; G11C 11/40615;
(Continued)

(56) References Cited

U.S. PATENT DOCUMENTS

2023/0042955 A1* 2/2023 You ..................... G11C 11/4085

* cited by examiner

*Primary Examiner* — Thong Q Le
(74) *Attorney, Agent, or Firm* — Colby Nipper PLLC

(57) ABSTRACT

Apparatuses and techniques for implementing aspects of proactive usage-based disturbance mitigation based on resource availability are described. In an example aspect, usage-based disturbance circuitry of a memory device performs usage-based disturbance mitigation based on multiple criteria. A primary criterion is associated with normal usage-based disturbance mitigation and can enable the memory device to balance power consumption with usage-based disturbance mitigation. At least one secondary criterion is less strict compared to the primary criterion. While a resource is available, the usage-based disturbance circuitry can proactively mitigate usage-based disturbance based on activated rows that satisfy the secondary criterion but don't yet satisfy the primary criterion. With these preemptive measures, the usage-based disturbance circuitry can reduce a probability of a waterfall event causing a denial-of-service (DOS) situation while the resource is available. If the resource becomes limited, the usage-based disturbance circuitry temporarily disables proactive usage-based disturbance mitigation until the resource becomes available again.

20 Claims, 12 Drawing Sheets

(51) Int. Cl.
*G11C 11/4093* (2006.01)
*G11C 11/4096* (2006.01)

(58) Field of Classification Search
CPC .......... G11C 11/40618; G11C 11/4091; G11C 11/4096; G11C 11/4097; G11C 11/4099; G11C 29/30; G11C 29/36; G11C 29/44; G11C 29/76; G11C 7/24; G11C 8/20
See application file for complete search history.

900

Perform, for a first activated row, usage-based disturbance mitigation based on a primary criterion
902

Perform, for a second activated row and based on an availability of a resource, the usage-based disturbance mitigation based on a secondary criterion that is less strict than the primary criterion
904

```
┌─────────────────────────────────────────┐
│   Store, within multiple rows of a      │
│   memory array, activation counts       │
│   that represent a quantity of times    │
│   corresponding rows have been activated│
│                  1102                   │
└─────────────────────────────────────────┘
                    │
                    ▼
┌─────────────────────────────────────────┐
│  Compare the activation counts          │
│  associated with a first set of         │
│  activated rows to a first threshold    │
│                  1104                   │
└─────────────────────────────────────────┘
                    │
                    ▼
┌─────────────────────────────────────────┐
│  Compare the activation counts          │
│  associated with a second set of        │
│  activated rows to a second threshold   │
│  that is less than the first threshold, │
│  wherein the first set of activated     │
│  rows and the second set of activated   │
│  rows represent at least a portion of   │
│  the multiple rows                      │
│                  1106                   │
└─────────────────────────────────────────┘
```

FIG. 11

PROACTIVE USAGE-BASED DISTURBANCE MITIGATION BASED ON RESOURCE AVAILABILITY

CROSS-REFERENCE TO RELATED APPLICATION(S)

This application claims the benefit of U.S. Provisional Patent Application Ser. No. 63/501,774 filed on May 12, 2023, the disclosure of which is incorporated by reference herein in its entirety.

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and non-volatile memory (e.g., flash memory). Like the capabilities of a processor, the capabilities of a memory can impact the performance of an electronic device. This performance impact can increase as processors are developed that execute code faster and as applications operate on increasingly larger data sets that require ever-larger memories.

BRIEF DESCRIPTION OF THE DRAWINGS

Apparatuses of and techniques for implementing aspects of proactive usage-based disturbance mitigation based on resource availability are described with reference to the following drawings. The same numbers are used throughout the drawings to reference like features and components:

FIG. 9 illustrates a first example method of a memory device performing aspects of proactive usage-based disturbance mitigation based on resource availability;

FIG. 11 illustrates a third example method of a memory device performing aspects of proactive usage-based disturbance mitigation based on resource availability.

DETAILED DESCRIPTION

Overview

Figure 1:
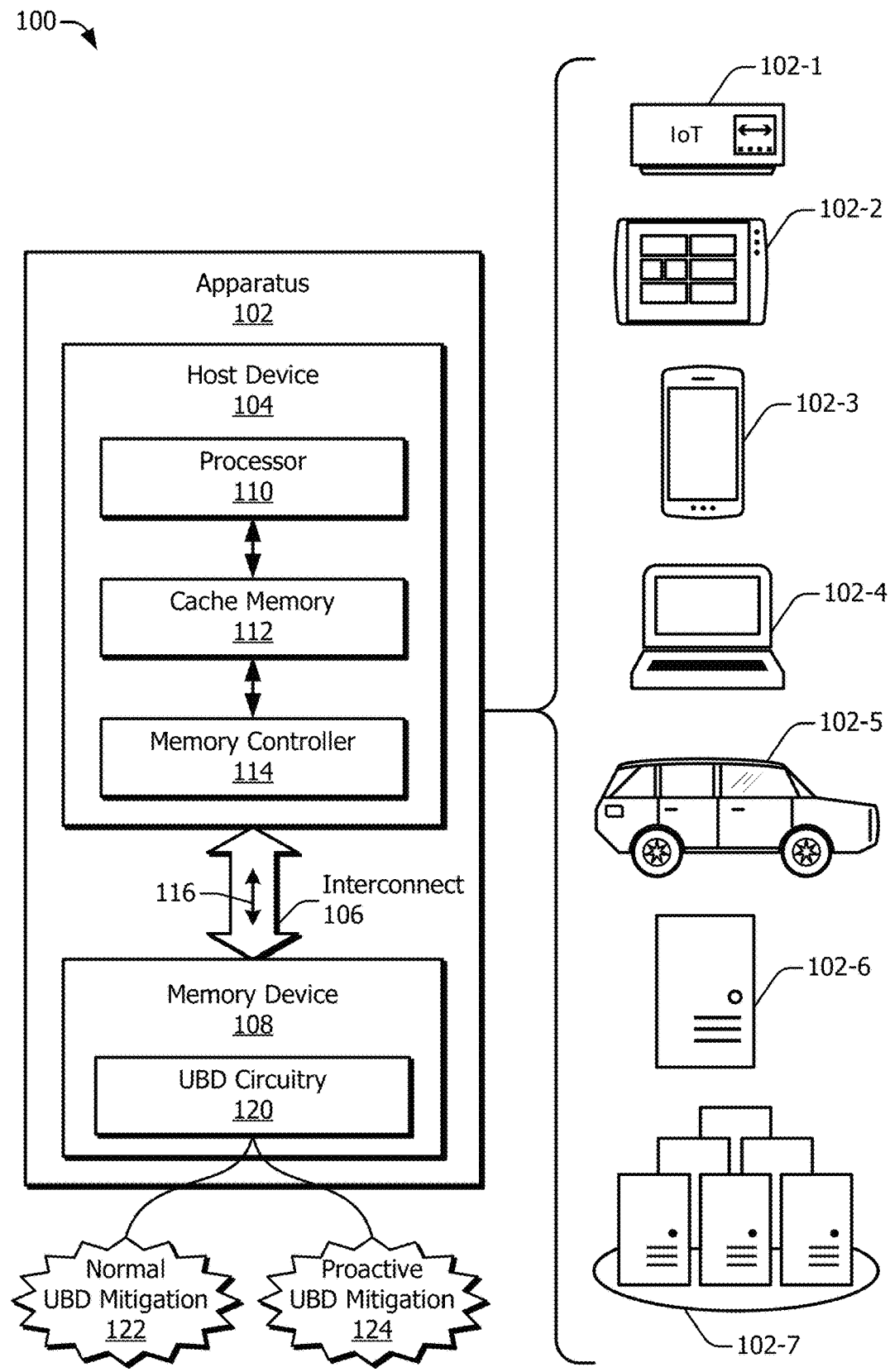
FIG. 1 illustrates example apparatuses that can implement aspects of proactive usage-based disturbance mitigation based on resource availability.

Processors and memory work in tandem to provide features to users of computers and other electronic devices. As processors and memory operate more quickly together in a complementary manner, an electronic device can provide enhanced features, such as high-resolution graphics and artificial intelligence (AI) analysis. Some applications, such as those for financial services, medical devices, and advanced driver assistance systems (ADAS), can also demand more-reliable memories. These applications use increasingly reliable memories to limit errors in financial transactions, medical decisions, and object identification. However, in some implementations, more-reliable memories can sacrifice bit densities, power efficiency, and simplicity.

To meet the demands for physically smaller memories, memory devices can be designed with higher chip densities. Increasing chip density, however, can increase the electromagnetic coupling (e.g., capacitive coupling) between adjacent or proximate rows of memory cells due, at least in part, to a shrinking distance between these rows. With this undesired coupling, activation (or charging) of a first row of memory cells can sometimes negatively impact a second nearby row of memory cells. In particular, activation of the first row can generate interference, or crosstalk, that causes the second row to experience a voltage fluctuation. In some instances, this voltage fluctuation can cause a state (or value) of a memory cell in the second row to be incorrectly determined by a sense amplifier. Consider an example in which a state of a memory cell in the second row is a "1". In this example, the voltage fluctuation can cause a sense amplifier to incorrectly determine the state of the memory cell to be a "0" instead of a "1". Left unchecked, this interference can lead to memory errors or data loss within the memory device.

In some circumstances, a particular row of memory cells is activated repeatedly in an unintentional or intentional (sometimes malicious) manner. Consider, for instance, that memory cells in an $R^{th}$ row are subjected to repeated activation, which causes one or more memory cells in an adjacent row (e.g., within an R+1 row, an R+2 row, an R−1 row, and/or an R−2 row) to change states. This effect is referred to as usage-based disturbance. The occurrence of usage-based disturbance can lead to the corruption or changing of contents within the affected row of memory.

Some memory devices monitor how often a row of memory cells is activated and refresh nearby rows to mitigate usage-based disturbance if the activation count exceeds a fixed threshold. In some situations, however, a waterfall event can activate a set of rows multiple times to cause the activation counts of these rows to exceed the fixed threshold within a relatively short time window. Consequently, the memory device may become too busy mitigating usage-based disturbance due to the waterfall event to be able to service read and/or write requests. This results in a denial-of-service (DOS) situation, which makes the memory device inaccessible to the memory controller and the user.

To address this and other issues regarding usage-based disturbance, this document describes techniques for performing proactive usage-based disturbance mitigation based on resource availability. In an example aspect, usage-based disturbance circuitry of a memory device performs usage-based disturbance mitigation based on multiple criteria. A primary criterion is associated with normal usage-based disturbance mitigation and can enable the memory device to balance power consumption with usage-based disturbance mitigation. At least one secondary criterion is less strict compared to the primary criterion. While a resource is available, the usage-based disturbance circuitry can proactively mitigate usage-based disturbance based on activated rows that satisfy the secondary criterion but don't yet satisfy the primary criterion. With these preemptive measures, the usage-based disturbance circuitry can reduce a probability of a waterfall event causing a denial-of-service (DOS) situation while the resource is available. If the resource becomes limited, the usage-based disturbance circuitry temporarily disables or halts proactive usage-based disturbance mitigation until the resource becomes available again.

Example Operating Environments

FIG. 1 illustrates, at 100 generally, an example operating environment including an apparatus 102 that can implement aspects of proactive usage-based disturbance mitigation based on resource availability. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure, a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit, graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a double-data-rate (DDR) memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. The memory controller 114 can, for example, receive memory requests from the processor 110 and provide the memory requests to external memory with appropriate formatting, timing, and reordering. The memory controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus (e.g., a unidirectional or bidirectional bus), switching fabric, or one or more wires that carry voltage or current signals. The interconnect 106 can propagate one or more communications 116 between the host device 104 and the memory device 108. For example, the host device 104 may transmit a memory request to the memory device 108 over the interconnect 106. Also, the memory device 108 may transmit a corresponding memory response to the host device 104 over the interconnect 106.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a printed circuit board (e.g., a rigid or flexible motherboard). The host device 104 and the memory device 108 may additionally be integrated together on an integrated circuit or fabricated on separate integrated circuits and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 1 an example computing system architecture having at least one host device 104 coupled to a memory device 108.

Two or more memory components (e.g., modules, dies, banks, or bank groups) can share the electrical paths or couplings of the interconnect 106. The interconnect 106 can include at least one command-and-address bus (CA bus) and at least one data bus (DQ bus). The command-and-address bus can transmit addresses and commands from the memory controller 114 of the host device 104 to the memory device 108, which may exclude propagation of data. The data bus can propagate data between the memory controller 114 and the memory device 108. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or a system-on-chip of the apparatus 102. The memory device 108 includes at least one instance of usage-based disturbance circuitry 120. The usage-based disturbance circuitry 120 mitigates usage-based disturbance for one or more banks associated with the memory device 108. The usage-based disturbance circuitry 120 can be implemented using software, firmware, hardware, fixed logic circuitry, or combinations thereof. Aspects of the usage-based disturbance circuitry 120 are further described with respect to FIG. 4.

The usage-based disturbance circuitry performs different aspects of usage-based disturbance mitigation depending on availability of one or more resources, such as a memory resource or a time resource. In some implementations, this involves the dynamic selection of different criterion. When a resource is limited, the usage-based disturbance circuitry 120 performs normal usage-based disturbance mitigation 122, which relies on a primary or baseline criterion. This primary criterion can be determined to balance power efficiency with mitigating usage-based disturbance. During normal use (e.g., in situations in which the memory device 108 is not subjected to a malicious attack), the resource may not be limited. However, the memory device 108 may be at risk of a waterfall event causing a denial-of-service situation.

To reduce this risk, the usage-based disturbance circuitry 120 can proactively mitigate usage-based disturbance while the resource is available by relaxing a criterion for performing usage-based disturbance mitigation. In this situation, the usage-based disturbance circuitry 120 performs proactive usage-based disturbance mitigation 124, which relies on a secondary criterion that is less strict (e.g., more relaxed) relative to the primary criterion. With the secondary criterion, the usage-based disturbance circuitry 120 can proactively mitigate usage-based disturbance associated with activated rows that do not yet satisfy the primary criterion but are likely to satisfy the primary criterion in the near future. In this way, the usage-based disturbance circuitry 120 can more efficiently utilize the available resource to better position itself to handle a possible waterfall event without causing a denial-of-service situation.

When the resource becomes limited, the usage-based disturbance circuitry 120 temporarily disables or halts the proactive usage-based disturbance mitigation 124 and continues performing normal usage-based disturbance mitigation 122. This enables the usage-based disturbance circuitry 120 to utilize the limited resource for mitigating usage-based disturbance for conditions associated with a higher risk of causing memory errors or data loss. By dynamically relying on different criterion depending on available of a resource, the usage-based disturbance circuitry 120 can take proactive steps to prevent a denial-of-service situation when the resource is available or focus on high-risk conditions if the resource is limited. The usage-based disturbance circuitry 120 is further described with respect to FIG. 2.

Figure 2:
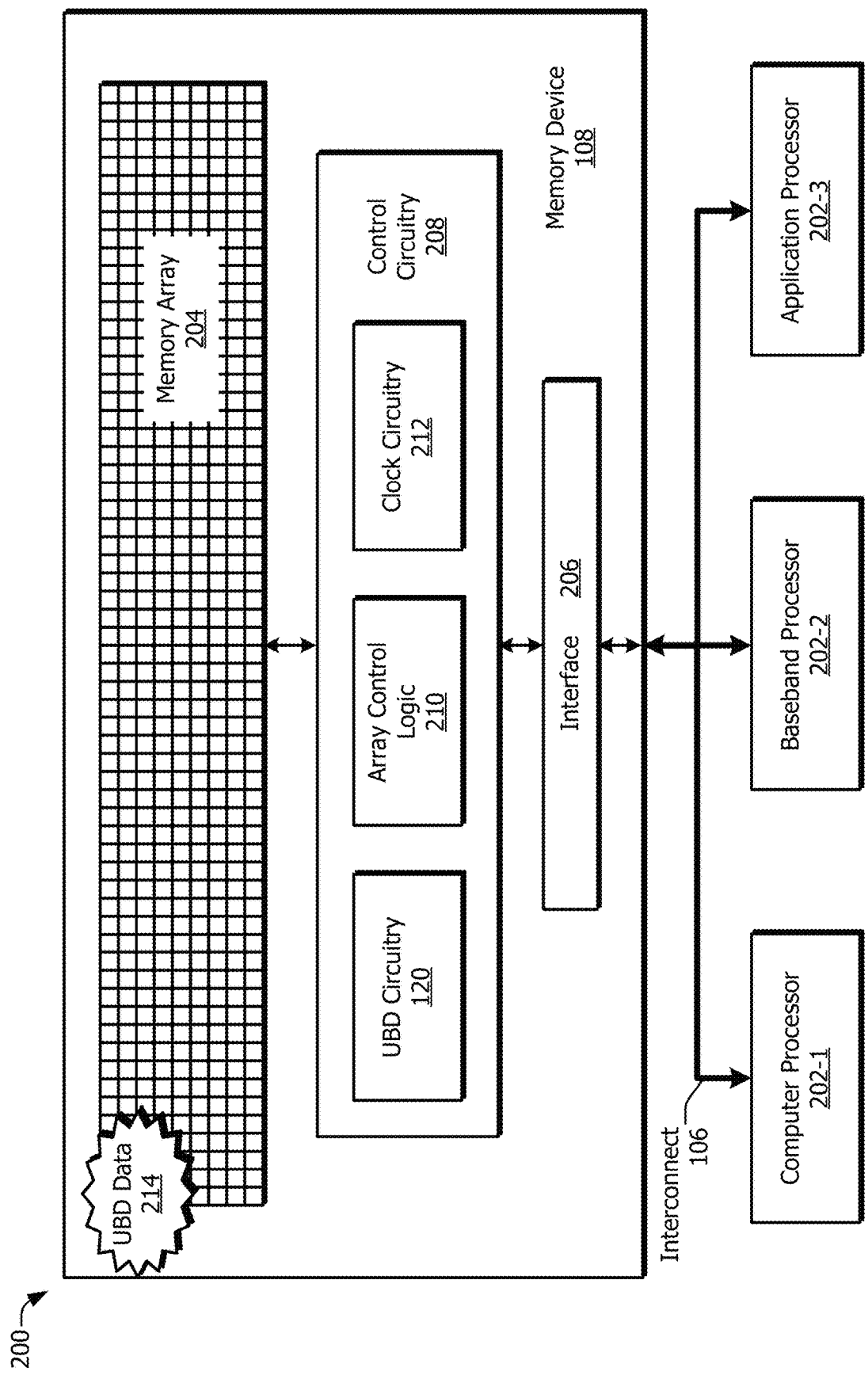
FIG. 2 illustrates an example computing system that can implement aspects of proactive usage-based disturbance mitigation based on resource availability.

FIG. 2 illustrates an example computing system 200 that can implement aspects of a proactive usage-based disturbance mitigation based on resource availability. In some implementations, the computing system 200 includes at least one memory device 108, at least one interconnect 106, and at least one processor 202. The memory device 108 can include, or be associated with, at least one memory array 204, at least one interface 206, and control circuitry 208 (or periphery circuitry) operatively coupled to the memory array 204. The memory array 204 can include an array of memory cells, including but not limited to memory cells of DRAM, SDRAM, three-dimensional (3D) stacked DRAM, DDR memory, LPDDR SDRAM, and so forth. The memory array 204 and the control circuitry 208 may be components on a single semiconductor die or on separate semiconductor dies. The memory array 204 or the control circuitry 208 may also be distributed across multiple dies. This control circuitry 208 may manage traffic on a bus that is separate from the interconnect 106.

The control circuitry 208 can include various components that the memory device 108 can use to perform various operations. These operations can include communicating with other devices, managing memory performance, performing refresh operations (e.g., self-refresh operations or auto-refresh operations), and performing memory read or write operations. For example, the control circuitry 208 can include at least one instance of array control logic 210 and clock circuitry 212. The array control logic 210 can include circuitry that provides command decoding, address decoding, input/output functions, amplification circuitry, power supply management, power control modes, and other functions. The clock circuitry 212 can synchronize various memory components with one or more external clock signals provided over the interconnect 106, including a command-and-address clock or a data clock. The clock circuitry 212 can also use an internal clock signal to synchronize memory components and may provide timer functionality.

The memory device 108 also includes the usage-based disturbance circuitry 120. In some aspects, the usage-based disturbance circuitry 120 can be considered part of the control circuitry 208, as shown in FIG. 2. For example, the usage-based disturbance circuitry 120 can represent another part of the control circuitry 208. The usage-based disturbance circuitry 120 can be coupled to a set of memory cells within the memory array 204 that store usage-based disturbance data 214. The usage-based disturbance data 214 can include information such as an activation count, which represents a quantity of times one or more rows within the memory array 204 have been activated (or accessed) by the memory device 108.

In example implementations, each row of the memory array 204 includes a subset of memory cells that stores the usage-based disturbance data 214 associated with that row. For example, a first row includes a subset of memory cells that store a first activation count representing a quantity of times the first row has been activated. Additionally, a second row includes another subset of memory cells that store a second activation count representing a quantity of times the second row has been activated. Other implementations are also possible in which the activation count represents a quantity of activations associated with more than one row.

During memory operations, the usage-based disturbance circuitry 120 can perform operations based on the usage-based disturbance data 214. For example, the usage-based disturbance circuitry can monitor and update the activation count associated with an activated row. Example operations of the usage-based disturbance circuitry 120 are further described with respect to FIG. 4.

The interface 206 can couple the control circuitry 208 or the memory array 204 directly or indirectly to the interconnect 106. In some implementations, the usage-based disturbance circuitry 120, the array control logic 210, and the clock circuitry 212 can be part of a single component (e.g., the control circuitry 208). In other implementations, one or more of the usage-based disturbance circuitry 120, the array control logic 210, or the clock circuitry 212 may be implemented as separate components, which can be provided on a single semiconductor die or disposed across multiple semiconductor dies. These components may individually or jointly couple to the interconnect 106 via the interface 206.

The interconnect 106 may use one or more of a variety of interconnects that communicatively couple together various components and enable commands, addresses, or other information and data to be transferred between two or more components (e.g., between the memory device 108 and the processor 202). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a command-and-address bus and a data bus.

In some aspects, the memory device 108 may be a "separate" component relative to the host device 104 (of FIG. 1) or any of the processors 202. The separate components can include a printed circuit board, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 202, by being combined on a printed circuit board or in a single package or a system-on-chip.

As shown in FIG. 2, the processors 202 may include a computer processor 202-1, a baseband processor 202-2, and an application processor 202-3, coupled to the memory device 108 through the interconnect 106. The processors 202 may include or form a part of a central processing unit, graphics processing unit, system-on-chip, application-specific integrated circuit, or field-programmable gate array. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, Wi-Fi®, Bluetooth®, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices).

Example Techniques and Hardware

Figure 3:
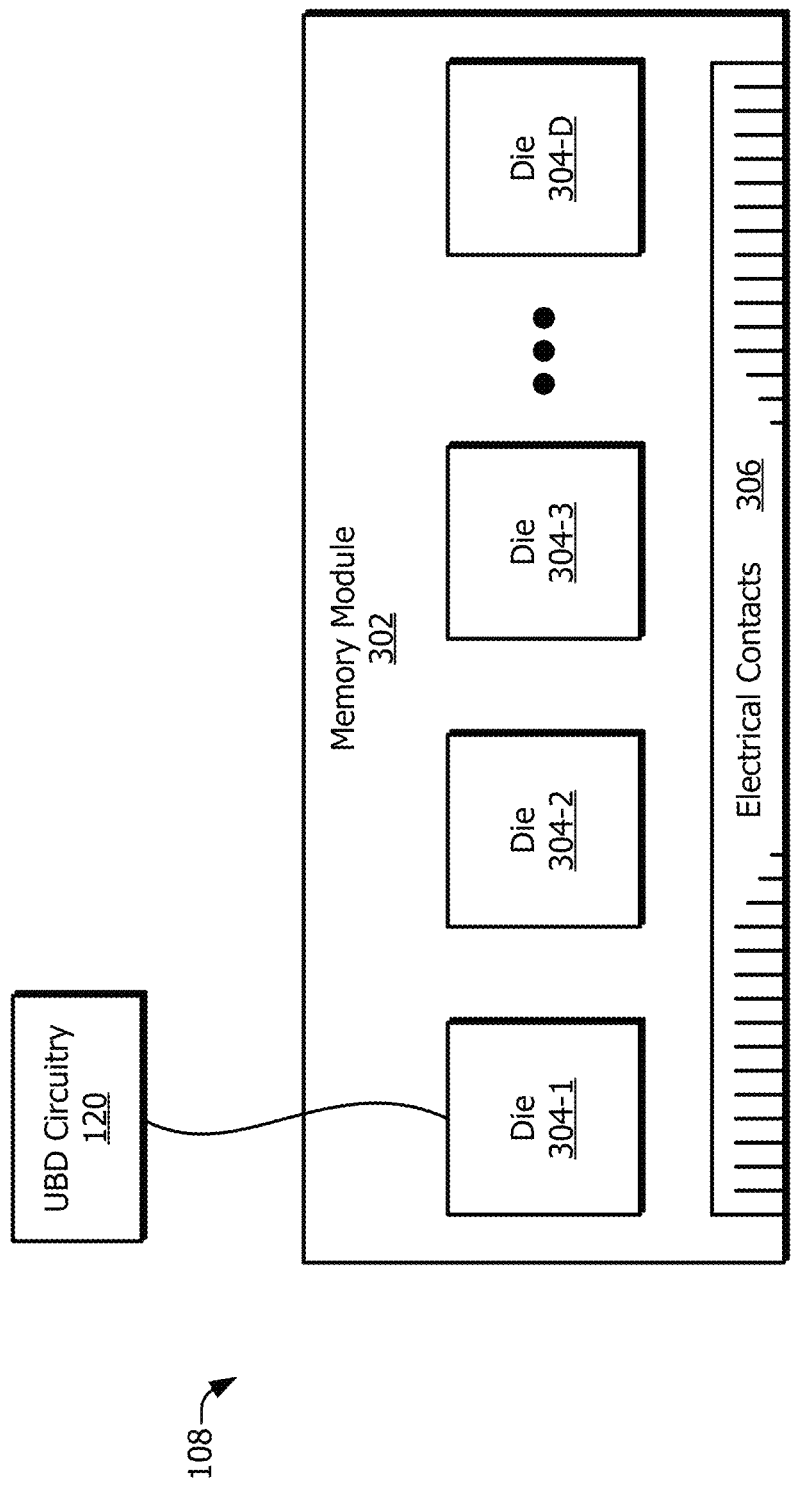
FIG. 3 illustrates an example memory device in which aspects of proactive usage-based disturbance mitigation based on resource availability may be implemented.

FIG. 3 illustrates an example memory device 108 in which aspects of proactive usage-based disturbance mitigation based on resource availability can be implemented. The memory device 108 includes a memory module 302, which can include multiple dies 304. As illustrated, the memory module 302 includes a first die 304-1, a second die 304-2, a third die 304-3, and a $D^{th}$ die 304-D, with D representing a positive integer. One or more of the dies 304-1 to 304-D include the usage-based disturbance circuitry 120.

The memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to multiple dies (or dice) 304-1 through 304-D, or a memory module 302 with two or more dies 304. As shown, the memory module 302 can include one or more electrical contacts 306 (e.g., pins) to interface the memory module 302 to other components.

The memory module 302 can be implemented in various manners. For example, the memory module 302 may include a printed circuit board, and the multiple dies 304-1 through 304-D may be mounted or otherwise attached to the printed circuit board. The dies 304 (e.g., memory dies) may be arranged in a line or along two or more dimensions (e.g., forming a grid or array). The dies 304 may have a similar size or may have different sizes. Each die 304 may be similar to another die 304 or different in size, shape, data capacity, or control circuitries. The dies 304 may also be positioned on a single side or on multiple sides of the memory module 302. An example implementation of the usage-based disturbance circuitry 120 is further described with respect to FIG. 4.

Figure 4:
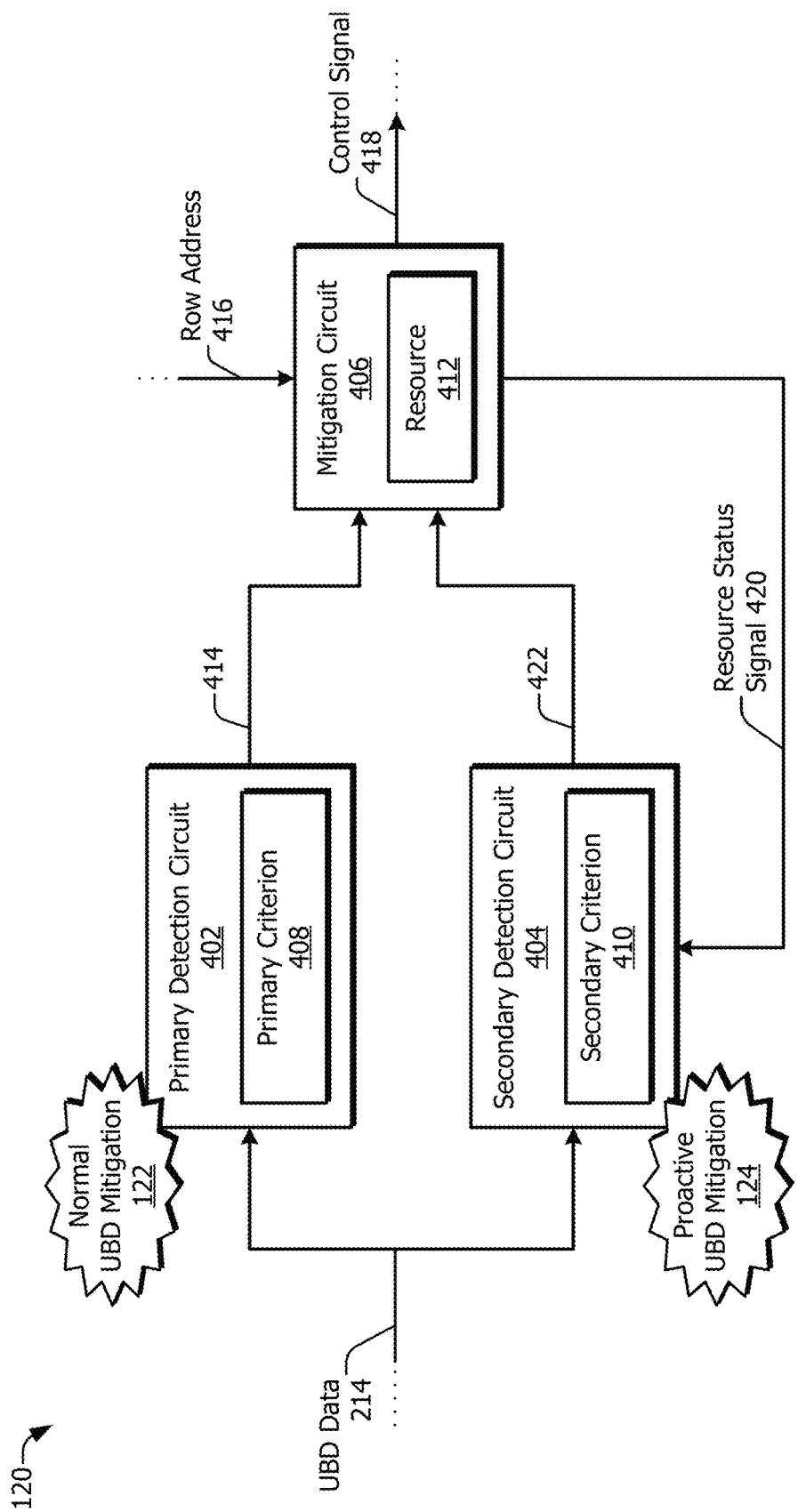
FIG. 4 illustrates example components of usage-based disturbance circuitry that can implement aspects of usage-based disturbance mitigation.

FIG. 4 illustrates example components of the usage-based disturbance circuitry 120, which can implement aspects of proactive usage-based disturbance mitigation based on resource availability. In the depicted configuration, the usage-based disturbance circuitry 120 includes a primary detection circuit 402 (e.g., a baseline detection circuit, a main detection circuit, or a first detection circuit), at least one secondary detection circuit 404 (e.g., at least one proactive detection circuit, at least one resource-dependent detection circuit, or at least one second detection circuit), and at least one mitigation circuit 406. In some implementations, the primary detection circuit 402 and the secondary detection circuit 404 are generally coupled in parallel between an input of the usage-based disturbance circuitry 120 (or another component of the usage-based disturbance circuitry 120) and the mitigation circuit 406. The usage-based disturbance circuitry 120 can also include other components not shown in FIG. 4, such as at least one counter circuit (shown in FIGS. 7 and 8) and/or at least one error-correction-code (ECC) circuit for detecting and/or correcting bit errors.

The primary detection circuit 402 and the secondary detection circuit 404 detect conditions associated with usage-based disturbance using different criterion. In particular, the primary detection circuit 402 uses a primary criterion 408 (or a first criterion), and the secondary detection circuit 404 uses a secondary criterion 410 (or a second criterion), which is easier to satisfy than the primary criterion 408. More specifically, an activated row has a higher probability of satisfying the secondary criterion 410 than satisfying the primary criterion 408. Explained another way, the secondary criterion 410 is less strict, less stringent, or more relaxed compared to the primary criterion 408. Also, the primary criterion 408 is more strict, more stringent, or less relaxed compared to the secondary criterion 410.

In some implementations, the primary criterion 408 is fixed and does not change over time. In other implementations, the primary criterion 408 is at least partially randomized. For example, the primary criterion 408 be implemented by a threshold that is dependent on some combination of a base number (e.g., a fixed number) and a random number (e.g., a varying number).

The mitigation circuit 406 causes the memory device 108 to refresh one or more rows to mitigate usage-based disturbance based on conditions detected by the primary detection circuit 402 and/or the secondary detection circuit 404. Although not explicitly shown in FIG. 4, the mitigation circuit 406 can be coupled to the control circuitry 208 or another component of the control circuitry 208.

An operation of the mitigation circuit 406 (and more generally the usage-based disturbance circuitry 120) can be constrained by the availability of one or more resources 412. The resource 412 can represent a memory resource and/or a timing resource. In some implementations, the mitigation circuit 406 includes at least one queue, and the memory resource represents a fullness level of the queue. Example queues are further described with respect to FIGS. 7 and 8. The timing resource can represent an amount of time available for the memory device 108 to perform usage-based disturbance mitigation (e.g., refresh victim rows).

Depending on how often the primary detection circuit 402 and/or the secondary detection circuit 404 detect conditions associated with usage-based disturbance, the resource 412 associated with mitigating usage-based disturbance may be available or limited. The usage-based disturbance circuitry 120 can dynamically perform normal usage-based disturbance mitigation 122 or proactive usage-based disturbance mitigation 124 based on the availability of the resource 412, as further described below.

During an operation of the apparatus 102, the memory device 108 performs a memory operation (e.g., a read or write operation) in which at least one row within the memory array 204 is activated. As part of the memory operation, the memory device 108 reads the usage-based disturbance data 214 that is stored within the memory array 204 and is associated with the activated row.

The usage-based disturbance circuitry 120 accepts the usage-based disturbance data 214 from the memory array 204. The primary detection circuit 402 determines whether or not a condition associated with usage-based disturbance exists for the activated row based on a primary criterion 408. In particular, the primary detection circuit 402 analyzes the usage-based disturbance data 214 to determine whether it satisfies (e.g., meets) or does not satisfy (e.g., does not meet) the primary criterion 408. If the primary criterion 408 is met, the primary detection circuit 402 determines that the condition associated with usage-based disturbance exists. If the primary criterion 408 is not met, the primary detection circuit 402 determines that the condition associated with usage-based disturbance does not exist.

The primary detection circuit 402 generates a signal 414, which indicates whether or not the condition associated with usage-based disturbance is detected. If the signal 414 indicates that the condition is not detected, the mitigation circuit 406 may take no further action. If the signal 414 indicates that the condition is detected, the mitigation circuit 406 stores a row address 416 associated with the activated row. In this case, the activated row can be referred to as an aggressor row.

To mitigate the usage-based disturbance associated with the detected condition, the mitigation circuit 406 causes the memory device 108 to refresh one or more rows within the memory array 204. These rows can be referred to as victim rows and represent rows that are proximate to, and in some instances adjacent to, the aggressor row. For example, an $R^{th}$ row of the memory array 204 can represent an aggressor row, and rows R+1, R+2, R−1, and/or R−2 can represent victim rows. The mitigation circuit 406 can generate a control signal 418 to cause the memory device 108 to perform the refresh operation.

The operation described above is generally associated with the normal usage-based disturbance mitigation 122. This is because an operation of the primary detection circuit 402 and the utilization of the primary criterion 408 (e.g., the strictest criterion) can be considered the default, main, or baseline operation for mitigating usage-based disturbance within the memory device 108. In some implementations, normal usage-based disturbance mitigation 122 is performed independent (or regardless) of the availability of the resource 412. As such, the usage-based disturbance circuitry 120 can perform normal usage-based disturbance mitigation 122 if the resource 412 is limited or available.

Sometimes, however, the mitigation circuit 406 is not efficiently utilizing the resource 412 for normal usage-based disturbance mitigation 122. When the resource 412 is available, the usage-based disturbance circuitry 120 can perform the proactive usage-based disturbance mitigation 124 in addition to or instead of the normal usage-based disturbance mitigation 122. To manage power resources, the proactive usage-based disturbance mitigation 124 can be performed in a random, time-dependent, or activation-dependent manner while the resource 412 is available. In other words, while the resource 412 is available and the memory device 108 activates a set of rows, the usage-based disturbance circuitry 120 can perform the proactive usage-based disturbance mitigation 124 for a subset of the activated rows.

To perform the proactive usage-based disturbance mitigation 124, the mitigation circuit 406 generates a resource status signal 420, and passes this signal to the secondary detection circuit 404. If the resource status signal 420 indicates that the resource 412 is available for performing the proactive usage-based disturbance mitigation 124, the secondary detection circuit 404 activates or is enabled. While active, the secondary detection circuit 404 determines whether or not a condition associated with usage-based disturbance exists for an activated row based on a secondary criterion 410. In particular, the secondary detection circuit 404 analyzes the usage-based disturbance data 214 to determine whether it satisfies (e.g., meets) or does not satisfy (e.g., does not meet) the secondary criterion 410. If the secondary criterion 410 is met, the secondary detection circuit 404 determines that the condition associated with usage-based disturbance exists. If the secondary criterion 410 is not met, the secondary detection circuit 404 determines that the condition associated with usage-based disturbance does not exist.

The secondary detection circuit 404 generates a signal 422, which indicates whether or not the condition associated with usage-based disturbance is detected. If the signal 422 indicates that the condition associated with usage-based disturbance is detected, the mitigation circuit 406 stores a row address 416 associated with the activated row, which can be referred to as an aggressor row as explained above. In this way, the usage-based disturbance circuitry 120 can proactively mitigate usage-based disturbance based on rows that satisfy the less-strict secondary criterion 410, but do not yet satisfy the stricter primary criterion 408, while the resource 412 is available.

If the resource status signal 420 indicates that the resource 412 is limited or not available for performing the proactive usage-based disturbance mitigation 124, the secondary detection circuit 404 deactivates or is disabled. This enables the usage-based disturbance circuitry 120 to dedicate the resource 412 to mitigating usage-based disturbance associated with conditions that satisfy the primary criterion 408. These conditions can be considered higher-risk conditions because of the strictness of the primary criterion 408 being associated with a higher probability of memory errors or data loss occurring within the memory device 108.

In some cases, a denial-of-service situation can occur if the usage-based disturbance circuitry 120 is unable to mitigate usage-based disturbance for additional detected conditions. This situation can occur, for instance, if the resource 412 is maxed out. Consider an example in which the resource 412 represents a fullness level of a queue. In this case, an overflow condition associated with the queue can cause the denial-of-service situation. To recover from the denial-of-service situation, the mitigation circuit 406 can generate an alert, and the memory device 108 can forego performing other memory operations to perform usage-based disturbance mitigation and free up the resource 412. By dynamically performing normal usage-based disturbance mitigation 122 or proactive usage-based disturbance mitigation 124 based on the availability of the resource 412, the usage-based disturbance circuitry 120 can more efficiently utilize the resource 412 while avoiding a denial-of-service situations. Furthermore, these techniques enable the memory device 108 to take proactive steps to reduce a risk of a waterfall event causing a denial-of-service situation. The dynamic switching between normal usage-based disturbance mitigation 122 and proactive usage-based disturbance mitigation 124 based on availability of the resource 412 is further described with respect to FIGS. 5 and 6.

Figure 5:
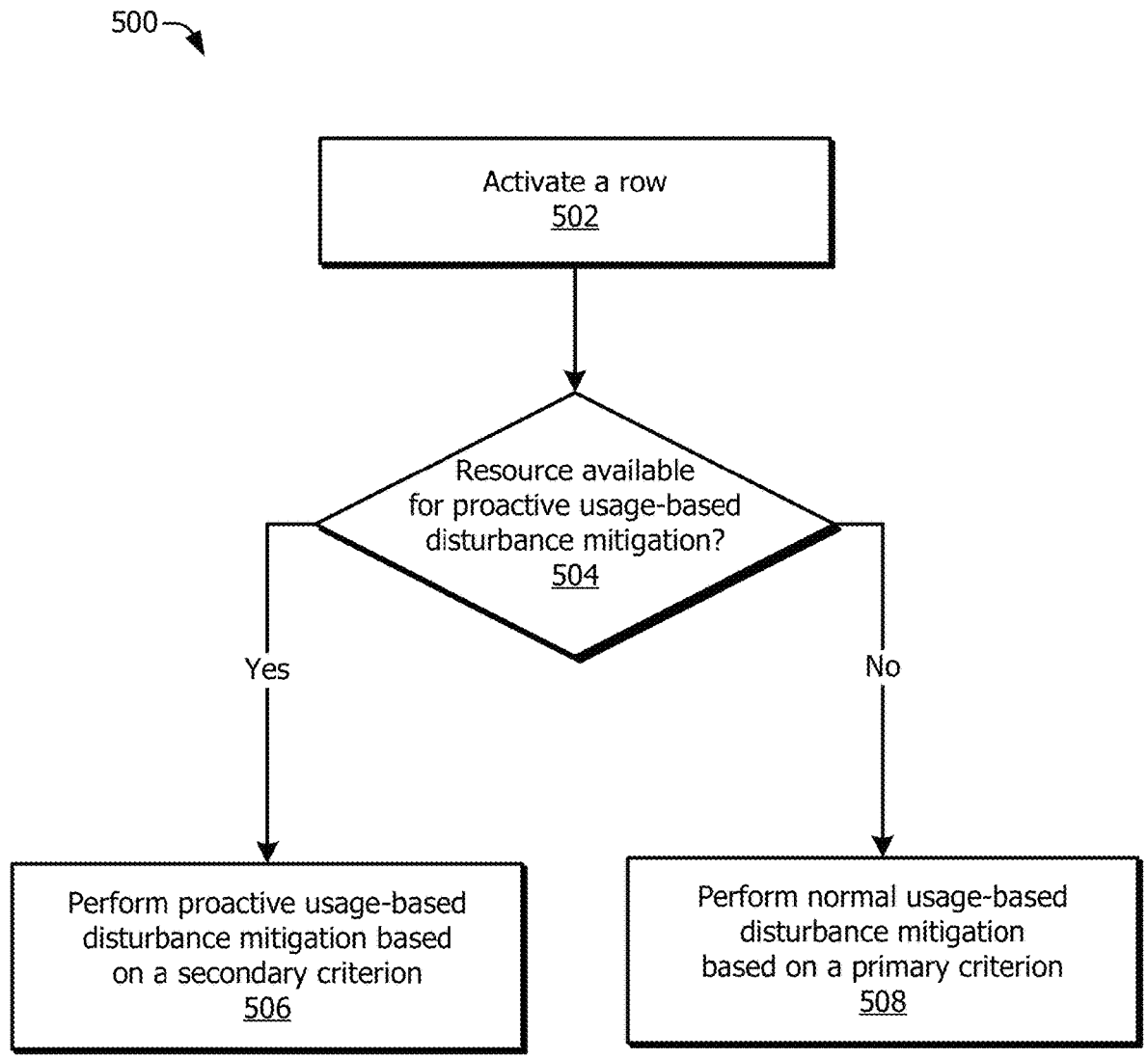
FIG. 5 illustrates an example flow diagram for implementing aspects of proactive usage-based disturbance mitigation based on resource availability.

FIG. 5 illustrates an example flow diagram 500 for implementing aspects of proactive usage-based disturbance mitigation based on resource availability. At 502, the memory device 108 activates a row within the memory array 204. The memory device 108 can activate the row based on an activate command received by the memory controller 114. The activate command can be associated with a read and/or write operation.

At 504, the usage-based disturbance circuitry 120 determines if the resource 412 is available for proactive usage-based disturbance mitigation 124. If the resource 412 is available, the usage-based disturbance circuitry 120 performs the proactive usage-based disturbance mitigation 124 based on the secondary criterion 410, as shown at 506. If the resource 412 is not available, the usage-based disturbance circuitry 120 performs the normal usage-based disturbance mitigation 122 based on the primary criterion 408, as shown at 508. As explained above, the primary criterion 408 is stricter than the secondary criterion 410.

Figure 7:
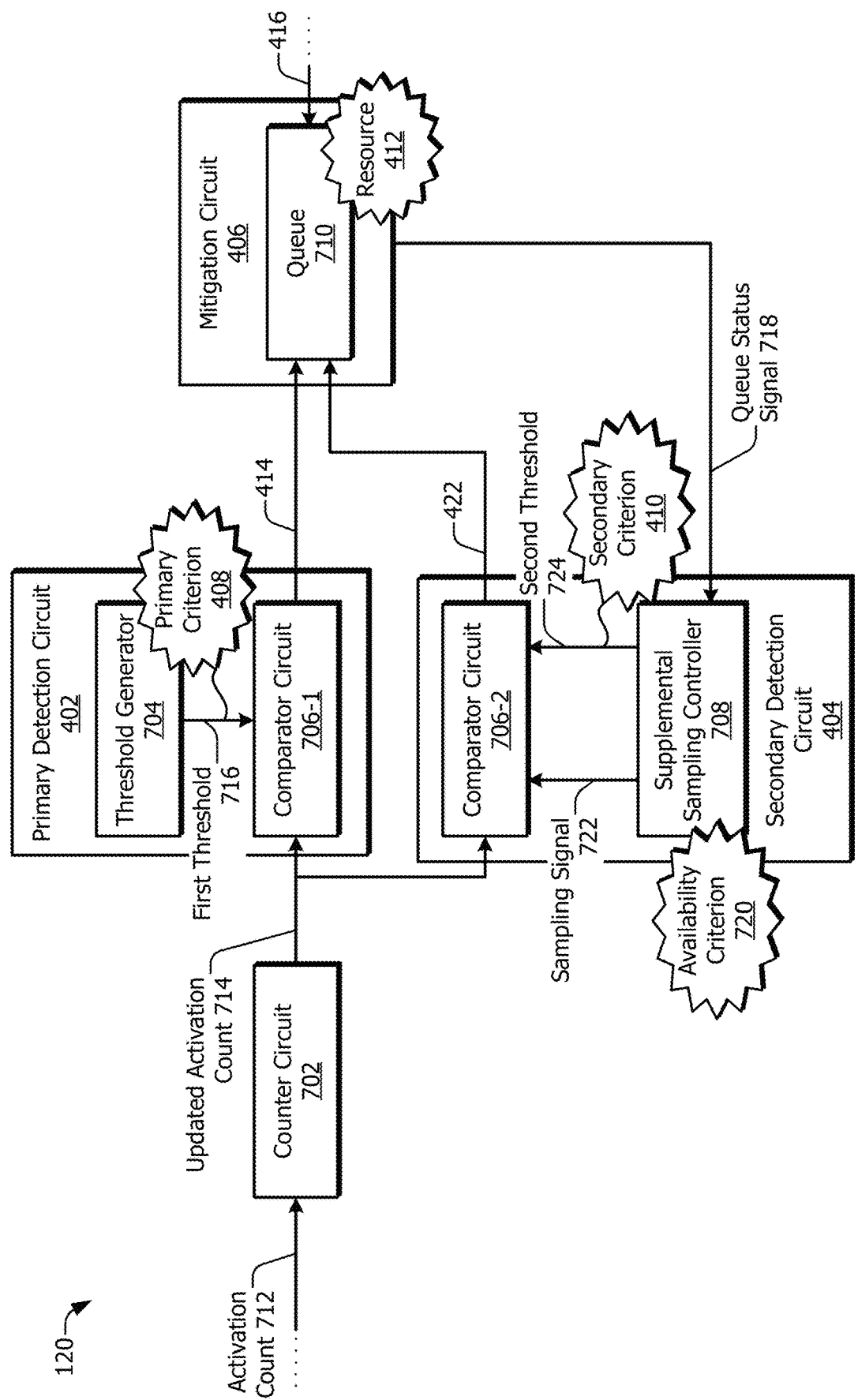
FIG. 7 illustrates a first example implementation of usage-based disturbance circuitry.

In some implementations, a determination that the resource 412 is available can be explicitly determined by the usage-based disturbance circuitry 120, as described with respect to FIGS. 4 and 7. In other implementations, this step is optional and a determination that the resource 412 is available can be accounted for based on a priority of operations performed by the usage-based disturbance circuitry 120, as described with respect to FIG. 8.

The performing of the proactive usage-based disturbance mitigation 124 at 506 and the performing of the normal usage-based disturbance mitigation 122 at 508 can include determining whether a condition associated with usage-based disturbance exists (e.g., based on the secondary criterion 410 or the primary criterion 408 respectively) and refreshing one or more victim rows associated with the detected condition. In some implementations, the usage-based disturbance circuitry 120 performs the proactive usage-based disturbance mitigation 124 on a subset of rows that are activated while the resource 412 is available, as further explained with respect to FIG. 6.

Figure 6:
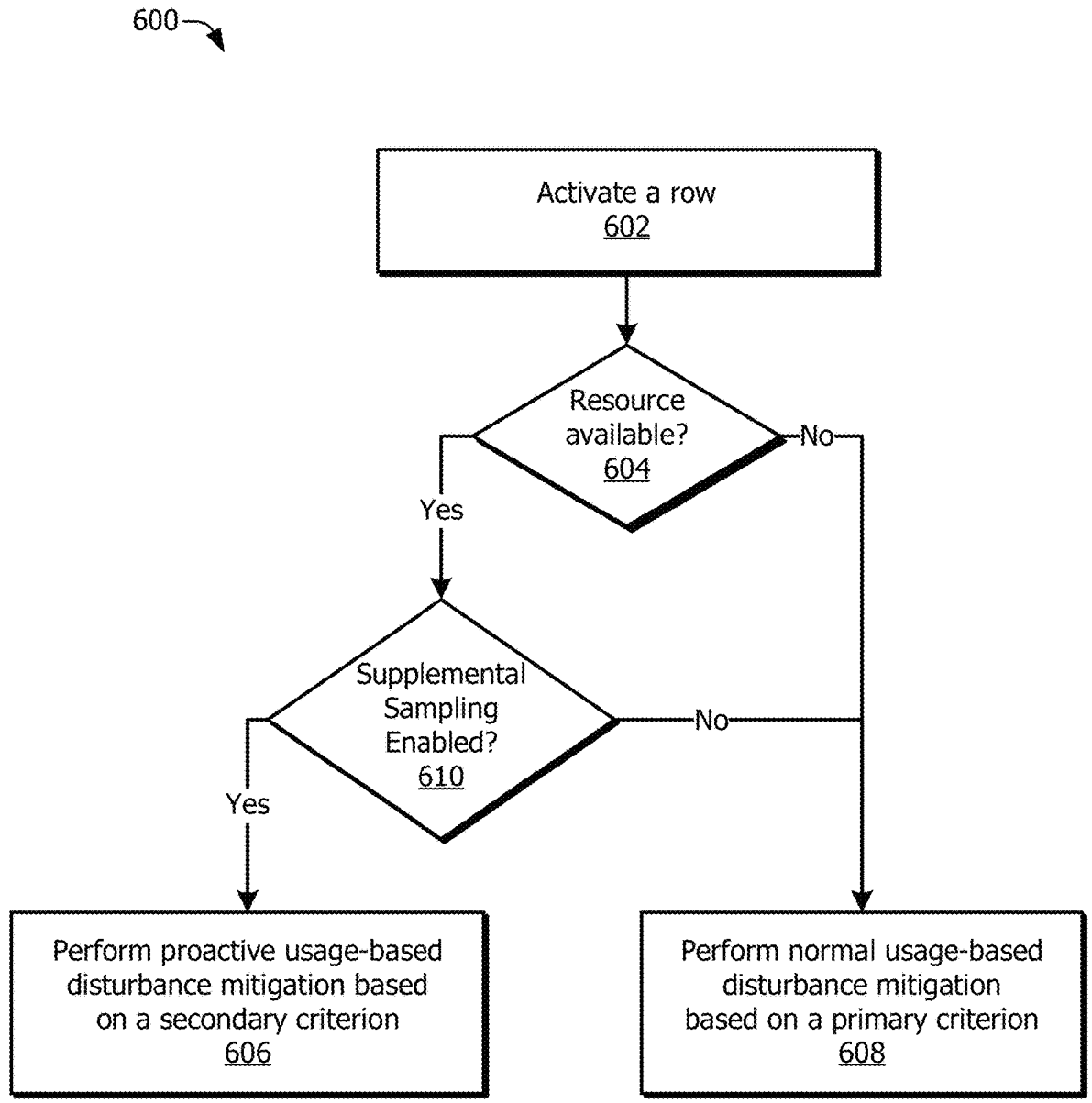
FIG. 6 illustrates another example flow diagram for implementing aspects of proactive usage-based disturbance mitigation based on resource availability.

FIG. 6 illustrates another example flow diagram 600 for implementing aspects of proactive usage-based disturbance mitigation based on resource availability. The flow diagram 600 in FIG. 6 is similar to the flow diagram 500 in FIG. 5. In particular, the operations at 602, 604, 606, and 608 are similar to the operations described in FIG. 5 at 502, 504, 506, and 508, respectively. The flow diagram 600, however, has an additional operation 610, which can be performed between 604 and 606.

At 610, the usage-based disturbance circuitry 120 (or the secondary detection circuit 404) includes control logic that schedules the proactive usage-based disturbance mitigation 124 in a random, time-dependent, or activation-dependent manner while the resource 412 is available. This operation is referred to as supplemental sampling, and is further described with respect to FIGS. 7 and 8. If the resource 412 is available at 604 and supplemental sampling is enabled at 610, the usage-based disturbance circuitry 120 performs the proactive usage-based disturbance mitigation 124 based on the secondary criterion 410, as shown at 606. Alternatively, if the resource 412 is not available at 604 or the supplemental sampling is not enabled at 610, the usage-based disturbance circuitry 120 performs normal usage-based disturbance mitigation based on the primary criterion 408, as shown at 608.

The supplemental sampling determines how often the proactive usage-based disturbance mitigation 124 is performed while the resource 412 is available. By performing the proactive usage-based disturbance mitigation 124 occasionally (instead of for every activated row), the usage-based disturbance circuitry 120 can extend a duration that the resource 412 is available. The supplemental sampling also enables the usage-based disturbance circuitry 120 to utilize available the resource 412 in an un-deterministic way to increase a difficulty of a malicious actor identifying and overcoming the described usage-based disturbance mitigation techniques. Example implementations of the usage-based disturbance circuitry 120 are further described with respect to FIGS. 7 and 8.

FIG. 7 illustrates a first example implementation of the usage-based disturbance circuitry 120. In the depicted configuration, the usage-based disturbance circuitry 120 includes at least one counter circuit 702, the primary detection circuit 402, the secondary detection circuit 404, and the mitigation circuit 406. An input of the counter circuit 702 can be coupled to the memory array 204 (not shown). The primary detection circuit 402 is coupled between the counter circuit 702 and the mitigation circuit 406. The secondary detection circuit 404 is also coupled between the counter circuit 702 and the mitigation circuit 406.

The primary detection circuit 402 includes at least one threshold generator 704 and at least one first comparator circuit 706-1. The threshold generator 704 generates (e.g., specifics or determines) the primary criterion 408. The comparator circuit 706-1 determines whether or not an activated row satisfies the primary criterion 408.

The secondary detection circuit 404 includes at least one supplemental sampling controller 708 and at least one second comparator circuit 706-2. The supplemental sampling controller 708 can determine whether the resource 412 is available for proactive usage-based disturbance mitigation 124, control the timing of supplemental sampling (e.g., enable or disable supplemental sampling), and generate the secondary criterion 410. In some implementations, the supplemental sampling controller 708 can include a sampling generator, such as a random sampling generator, a time-dependent sampling generator, or an activation-dependent sampling generator. The random sampling generator can generate a signal with a period that changes over time in a random (e.g., true random, pseudorandom, or partially random) manner. The time-dependent sampling generator can generate a signal with a fixed period, which is associated with a particular duration in time. The activation-dependent sampling generator can generate a signal with a period that depends on a quantity of activation counts. The period of this signal can change over time based on how often the memory device 108 activates rows within the memory array 204. In an example implementation, supplemental sampling is to be performed every 2, 3, 5 or 10 activations. In this case, the period of the signal can change over time based on how frequently the memory device 108 performs the specified quantity of activations.

For supplemental sampling, the supplemental sampling controller 708 can control an operation of the second comparator circuit 706-2. In particular, the supplemental sampling controller 708 can enable or disable the second comparator circuit 706-2 based on a timing provided by the sampling generator and the availability of the resource 412. The second comparator circuit 706-2 can be implemented in a similar manner as the first comparator circuit 706-1.

In this example, the mitigation circuit 406 includes a single queue 710, which represents the resource 412. The queue 710 keeps track of rows within the memory array 204 that are associated with the usage-based disturbance condition (e.g., stores a list of aggressor rows). In some implementations, the queue 710 is implemented using multiple registers. The mitigation circuit 406 can process entries within the queue 710 based on a particular order. More specifically, the queue 710 can output entries in the particular order. Example orders in which the entries within the queue 710 are processed can represent a first-in first out order, a last-in first-out (LIFO) order, a random order, or a priority-based order.

During an operation of the memory device 108, the memory device 108 activates a row within the memory array 204. The memory device 108 also reads an activation count 712 that is stored within the memory array 204 and is associated with the activated row. The activation count 712 represents at least a portion of the usage-based disturbance data 214.

The usage-based disturbance circuitry 120 accepts the activation count 712 from the memory array 204. The counter circuit 702 increments the activation count 712 to generate an updated activation count 714. The updated activation count 714 represents a quantity of times that the row has been activated since a last refresh. The counter circuit 702 passes the updated activation count 714 to the comparator circuits 706-1 and 706-2.

To perform the operations of the primary detection circuit 402, the threshold generator 704 generates a first threshold 716, which represents the primary criterion 408. The comparator circuit 706-1 compares the updated activation count 714 to the first threshold 716 to detect the condition associated with usage-based disturbance based on the primary criterion 408. The comparator circuit 706-1 also generates the signal 414, which indicates whether the updated activation count 714 is greater than or equal to the first threshold 716, or is less than the first threshold 716. In some implementations, the comparator circuit 706-1 performs this comparison regardless of the state of the resource 412. In other implementations, the comparator circuit 706-1 performs this comparison if the proactive usage-based disturbance mitigation 124 is disabled, which can be due to limited availability of the resource 412 and/or supplemental sampling, as further described below.

The mitigation circuit 406 generates a queue status signal 718, and provides the queue status signal 718 to the supplemental sampling controller 708. The queue status signal 718 represents the resource status signal 420, and indicates a level of fullness associated with the queue 710. For example, the queue status signal 718 can indicate a quantity of entries within the queue 710 that are available or empty (e.g., not being used). The quantity of available entries can be indicated, for instance, as an integer number or as a percentage of a total size of the queue 710.

The supplemental sampling controller 708 evaluates the queue status signal 718 using an availability criterion 720, which can be implemented using one or more thresholds. Consider an example in which the availability criterion 720 includes a first threshold for enabling the proactive usage-based disturbance mitigation 124 and a second threshold for disabling the proactive usage-based disturbance mitigation 124. In this example, the second threshold is greater than the first threshold. If the level of fullness indicated by the queue status signal 718 is less than the first threshold, the supplemental sampling controller 708 determines that the resource 412 is available and enables the proactive usage-based disturbance mitigation 124. Alternatively, if the level of fullness indicated by the queue status signal 718 is greater than the second threshold, the supplemental sampling controller 708 determines that the resource 412 is limited and disables the proactive usage-based disturbance mitigation 124.

If the supplemental sampling controller 708 determines that the resource 412 is available, the supplemental sampling controller 708 can generate a sampling signal 722 and a second threshold 724, which represents the secondary criterion 410. The second threshold 724 is less than the first threshold 716.

While the resource 412 is available, the sampling signal 722 enables or disables the comparator circuit 706-2 in a random (e.g., true random, pseudorandom, or partially random) manner, a time-dependent manner (e.g., based on a timer), or an activation-dependent manner (e.g., based on a set quantity of activations between samplings). The random manner can make it more challenging for a malicious actor to identify and overcome the usage-based disturbance mitigation techniques. The time-dependent manner or activation-dependent manner can be configured to manage power consumption. In some implementations, the time-dependent or activation-dependent manners can consume less power than the random manner.

Based on the sampling signal 722, the comparator circuit 706-2 can perform aspects of supplemental sampling by comparing the updated activation count 714 to the second threshold 724 for a subset of rows (a proper subset of rows) that are activated while the resource 412 is available. The remaining rows not evaluated by the comparator circuit 706-2 can instead be evaluated by the comparator circuit 706-1. The comparator circuit 706-2 generates the signal 422, which indicates whether the updated activation count 714 is greater than or equal to the second threshold 724, or is less than the second threshold 724.

The mitigation circuit 406 populates an entry within the queue 710 with the row address 416 if the signal 414 or 422 indicates that the updated activation count 714 is greater than or equal to the first threshold 716 or second threshold 724, respectively. To mitigate the usage-based disturbance, the mitigation circuit 406 can cause the memory device 108 to refresh one or more victim rows associated with the row address 416. In some implementations, the queue 710 does not distinguish between the row addresses 416 of aggressor rows that satisfied the primary criterion 408 or the secondary criterion 410. Instead, the mitigation circuit 406 can mitigate usage-based disturbance in a particular order, such as in a first-in first-out order. In other implementations, the mitigation circuit 406 can have a secondary queue that is dedicated for proactive usage-based disturbance mitigation 124, as further described with respect to FIG. 8.

Figure 8:
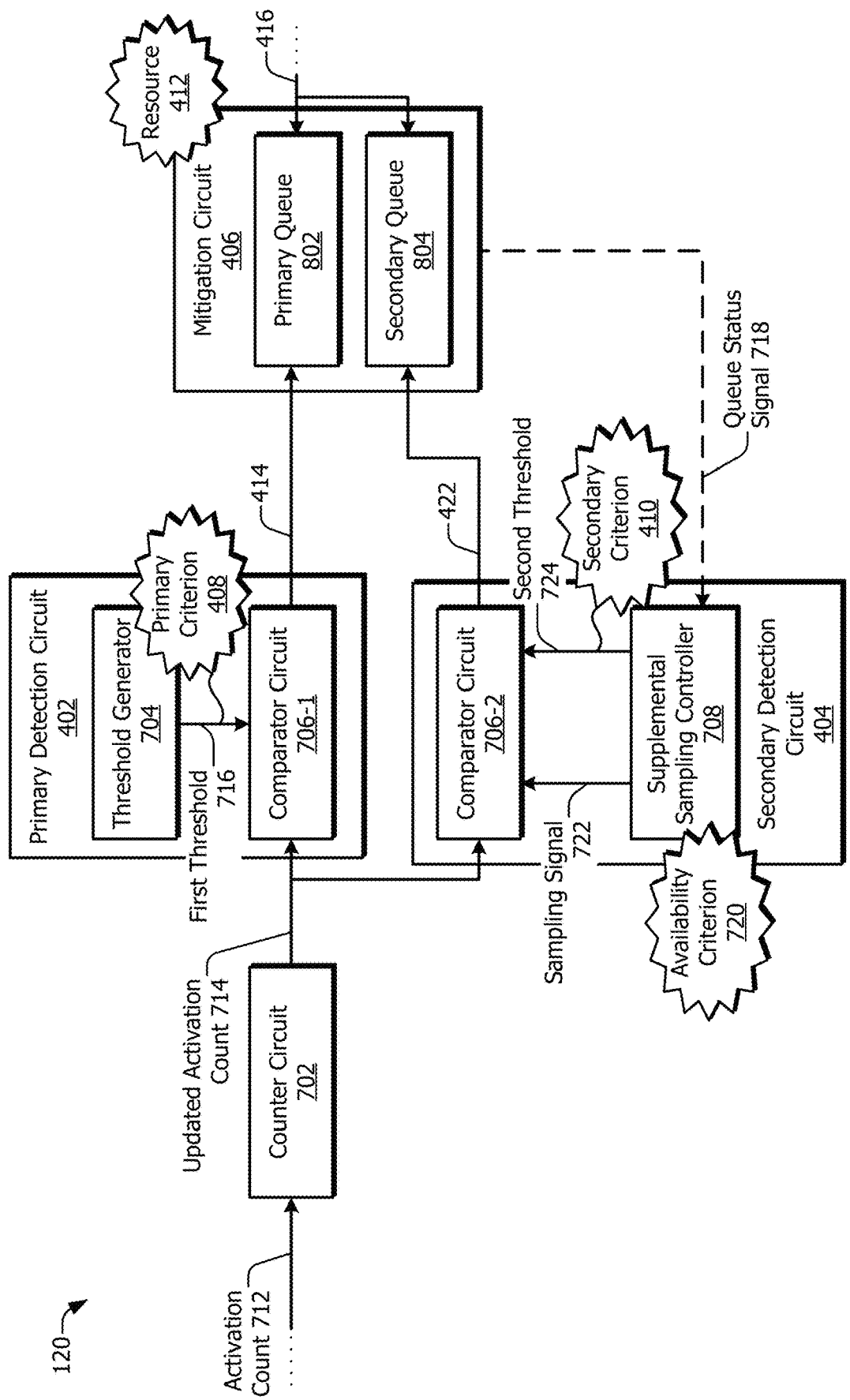
FIG. 8 illustrates a second example implementation of usage-based disturbance circuitry.

FIG. 8 illustrates a second example implementation of the usage-based disturbance circuitry 120. The usage-based disturbance circuitry 120 shown in FIG. 8 is similar to the usage-based disturbance circuitry 120 of FIG. 7, expect the queue 710 of FIG. 7 is implemented using multiple queues in FIG. 8. In the depicted configuration, the mitigation circuit 406 includes a primary queue 802 and at least one secondary queue 804. The secondary queue 804 can have a smaller size (e.g., fewer available entries or slots) compared to the primary queue 802. In an example implementation, the secondary queue 804 can be limited to one or two entries. Implementing the secondary queue 804 with a smaller size than the primary queue 802 can enable the usage-based disturbance circuitry 120 to have a smaller footprint.

In this example implementation, entries in the secondary queue 804 have a lower priority compared to entries in the primary queue 802. As such, the mitigation circuit 406 may not be able to mitigate usage-based disturbance that is associated with the one or more row addresses 416 stored in the secondary queue 804 due to a limited time resource. In this sense, the proactive usage-based disturbance mitigation 124 is at least indirectly dependent upon the availability of the resource 412.

The mitigation circuit 406 can generate an alert if an overflow condition associated with the primary queue 802 occurs. The alert can cause the memory device 108 to halt other operations and dedicate resources to mitigating usage-based disturbance based on row addresses 416 that are stored in the primary queue 802. The mitigation circuit 406, however, can ignore an overflow condition associated with the secondary queue 804. In this case, entries in the secondary queue 804 can be replaced with new entries.

During an operation, the mitigation circuit 406 populates an entry within the primary queue 802 with the row address 416 of the activated row if the signal 414 indicates that the updated activation count 714 is greater than or equal to the first threshold 716. The usage-based disturbance circuitry 120 can also reset the activation count 712 of the activated row to zero based on the mitigation circuit 406 populating the entry within the primary queue 802 with the row address 416. The mitigation circuit 406 can also populate an entry within the secondary queue 804 with the row address 416 of the activated row if the signal 422 indicates that the updated activation count 714 is greater than or equal to the second threshold 724. In this case, the usage-based disturbance circuitry 120 does not reset the activation count 712 of the activated row because the mitigation circuit 406 may not perform usage-based disturbance mitigation for the entry in the secondary queue 804 if the resource 412 is limited.

In an example implementation, the mitigation circuit 406 mitigates usage-based disturbance based on the entries within the primary queue 802 before mitigating usage-based disturbance based on the entries within the secondary queue 804. In this case, the resource 412 can be considered limited if the primary queue 802 is not empty (e.g., the primary queue 802 has entries). Alternatively, the resource 412 can be considered available if the primary queue 802 is empty (e.g., if the primary queue 802 does not have entries).

Once the primary queue 802 is empty, the mitigation circuit 406 mitigates usage-based disturbance based on the entries within the secondary queue 804. As part of this process, the mitigation circuit 406 can cause the activation count 712 associated with the entry in the secondary queue 804 to be cleared. In this way, the activation count 712 for a row that meets the secondary criterion 410 but does not meet the primary criterion 408 is not reset until the mitigation circuit 406 is able to address it.

In this example, the enabling or disabling of proactive usage-based disturbance mitigation 124 is controlled by the mitigation circuit 406 and can optionally be controlled by the supplemental sampling controller 708. More specifically, the generation of the sampling signal 722 and the second threshold 724 can optionally be dependent on the queue status signal 718. As such, the mitigation circuit 406 can optionally generate the queue status signal 718. Use of the queue status signal 718, however, can improve power conservation within the memory device 108 by selectively performing some operations of the supplemental sampling controller 708 (e.g., the generation of the sampling signal 722) based on the availability of the resource 412.

The usage-based disturbance circuitry 120 can also implement additional logic to support the proactive usage-based disturbance mitigation 124 using the secondary queue 804. For example, the mitigation circuit 406 can determine if a row address within the secondary queue 804 is also within the primary queue 802. In this case, the mitigation circuit 406 can remove the entry within the secondary queue 804. Also, any reset event can reset both the primary queue 802 and the secondary queue 804.

The usage-based disturbance circuitry 120 described with respect to FIG. 7 can be less complex to implement and can have a smaller die size relative to the usage-based disturbance circuitry 120 described with respect to FIG. 8. The usage-based disturbance circuitry 120 of FIG. 8, however, can operate more efficiently than the usage-based disturbance circuitry 120 of FIG. 7.

Although a single secondary detection circuit 404 is illustrated in FIGS. 4, 7, and 8, other implementation are also possible in which the usage-based disturbance circuitry 120 includes multiple secondary detection circuits 404. In this case, the multiple secondary detection circuits 404 can have different secondary criterion 410 with different degrees of strictness. As the resource 412 becomes more limited over time, the usage-based disturbance circuitry 120 can disable secondary detection circuits 404 associated with less strict secondary criteria 410. As the resource 412 becomes more available over time, the usage-based disturbance circuitry 120 can enable secondary detection circuits 404 associated with less strict secondary criteria 410. Alternatively, instead of implementing multiple secondary detection circuits 404, the usage-based disturbance circuitry 120 can include a single instance of the secondary detection circuit 404, which can dynamically adjust the secondary criterion 410 (e.g., the second threshold 724) based on a degree at which the resource 412 is available or limited.

Example Methods

This section describes example methods for implementing aspects of proactive usage-based disturbance mitigation based on resource availability with reference to the flow diagrams of FIGS. 9 to 12. These descriptions may also refer to components, entities, and other aspects depicted in FIGS. 1 to 8 by way of example only. The described methods are not necessarily limited to performance by one entity or multiple entities operating on one device.

FIG. 9 illustrates a method 900, which includes operations 902 and 904. In aspects, operations of the method 900 are implemented by a memory device 108 as described with reference to FIG. 1. At 902, usage-based disturbance mitigation based on a primary criterion is performed for a first activated row. For example, the usage-based disturbance circuitry 120 performs usage-based disturbance mitigation (e.g., normal usage-based disturbance mitigation 122) based on a primary criterion 408 for a first activated row within the memory array 204, as shown in FIG. 4. In particular, the primary detection circuit 402 compares an updated activation count 714 associated with the activated row to a first threshold 716 to detect a condition associated with usage-based disturbance, as shown in FIG. 7 or 8. If the updated activation count 714 is greater than or equal to the first threshold 716, the mitigation circuit 406 updates an entry in the queue 710 or the primary queue 802 with a row address 416 that corresponds with the activated row. The mitigation circuit 406 can also cause the memory device 108 to refresh one or more victim rows based on the row address 416.

At 904, the usage-based disturbance mitigation based on a secondary criterion that is less strict than the primary criterion is performed for a second activated row based on an availability of a resource. For example, the usage-based disturbance circuitry 120 performs the usage-based disturbance mitigation (e.g., the proactive usage-based disturbance mitigation 124) based on a secondary criterion 410 for a second activated row within the memory array 204 if the resource 412 is available for the proactive usage-based disturbance mitigation 124, as shown in FIG. 4. In some implementations, the usage-based disturbance circuitry 120 explicitly determines whether or not the resource 412 is available for proactive usage-based disturbance mitigation 124. For example, the secondary detection circuit 404 can determine the availability of the resource 412 based on a resource status signal 420 provided by the mitigation circuit 406, as described with respect to FIG. 7. In other implementations, an operation of the mitigation circuit 406 performs aspects of proactive usage-based disturbance mitigation 124 if the resource 412 is available and does not perform aspects of proactive usage-based disturbance mitigation 124 if the resource 412 is not available, as described with respect to FIG. 8.

The secondary criterion 410 is less strict than the primary criterion 408. This means that an activated row has a higher probability of satisfying the secondary criterion 410 compared to the primary criterion 408. In an example implementation, the primary criterion 408 is associated with a first threshold 716, and the secondary criterion 410 is associated with a second threshold 724 that is less than the first threshold 716.

To perform the proactive usage-based disturbance mitigation 124, the secondary detection circuit 404 compares an updated activation count 714 associated with the activated row to a second threshold 724 to detect a condition associated with usage-based disturbance, as shown in FIG. 7 or 8. If the updated activation count 714 is greater than or equal to the second threshold 724, the mitigation circuit 406 updates an entry in the queue 710 or the secondary queue 804 with a row address 416 that correspond with the activated row. The mitigation circuit 406 can also cause the memory device 108 to refresh one or more victim rows based on the row address 416.

Figure 10:
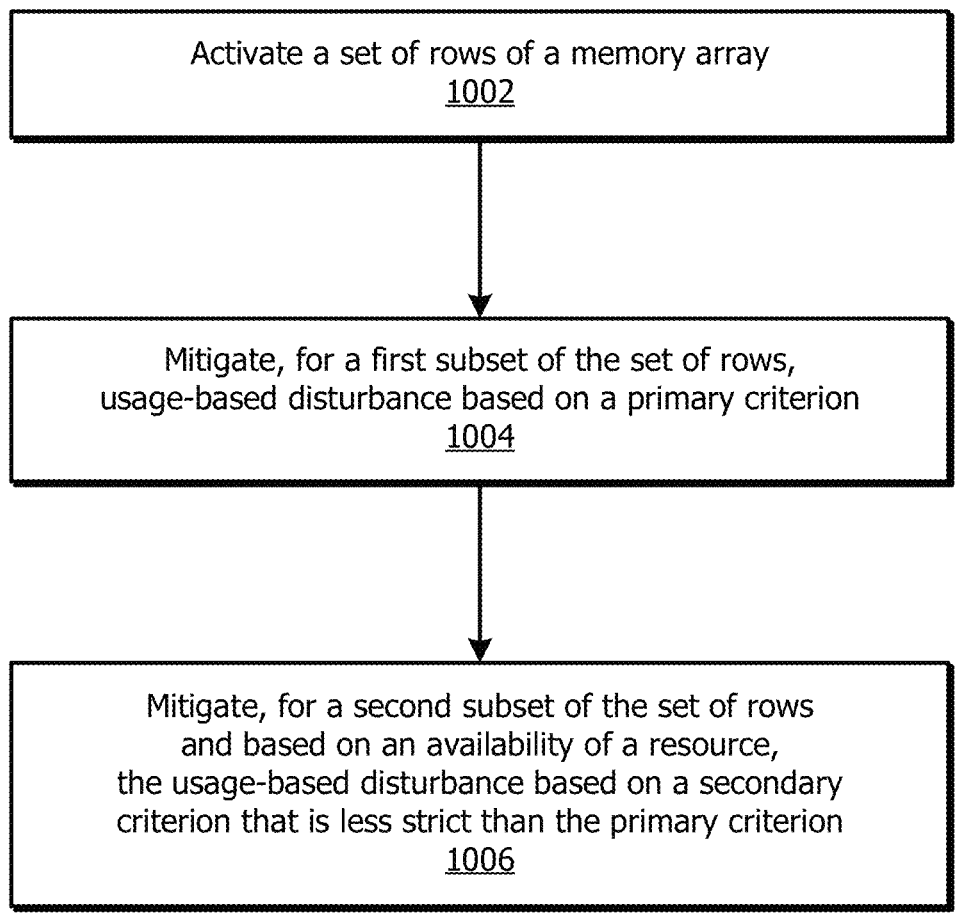
FIG. 10 illustrates a second example method of a memory device performing aspects of proactive usage-based disturbance mitigation based on resource availability.

FIG. 10 illustrates a method 1000, which includes operations 1002 through 1006. In aspects, operations of the method 1000 are implemented by a memory device 108 as described with reference to FIG. 1. At 1002, a set of rows of a memory array are activated. For example the memory device 108 activates the set of rows of the memory array 204 of FIG. 2.

At 1004, usage-based disturbance is mitigated based on a primary criterion for a first subset of the set of rows. For example, the usage-based disturbance circuitry 120 mitigates usage-based disturbance for a first subset of the set of rows based on the primary criterion 408, as described at 508 and 608 in FIGS. 5 and 6, respectively.

At 1006, the usage-based disturbance is mitigated based on a secondary criterion for a second subset of the set of rows and based on an availability of a resource. For example, the usage-based disturbance circuitry 120 mitigates the usage-based disturbance for a second subset of the set of rows based on the secondary criterion 410, as described at 506 and 606 in FIGS. 5 and 6, respectively.

The first subset and the second subset can include a same row that is activated at different times. In general, the activation of the first subset of the set of rows and the activation of the second subset of the set of rows are interspersed in time. This can be due, at least partially, to the supplemental sampling performed by the secondary detection circuit 404. In example implementations, the supplemental sampling can be performed in a random, time-dependent, or activation-dependent manner.

FIG. 11 illustrates a method 1100, which includes operations 1102 through 1106. In aspects, operations of the method 1100 are implemented by a memory device 108 as described with reference to FIG. 1. At 1102, activation counts that represent a quantity of times corresponding rows have been activated are stored within multiple rows of a memory array. For example, the memory array 204 of the memory device 108 stores the activation counts 712, which represent a quantity of times corresponding rows have been activated since a last refresh. The activation counts 712 can be part of the usage-based disturbance data 214. In some implementations, each row of the memory array 204 includes a set of memory cells that store an activation count 712 that corresponds to the row.

At 1104, the activation counts associated with a first set of activated rows is compared to a first threshold. For example, the primary detection circuit 402 uses the comparator circuit 706-1 to compare the activation counts 712 associated with a first set of activated rows to the first threshold 716, as shown in FIGS. 7 and 8.

At 1106, the activation counts associated with a second set of activated rows of are compared to a second threshold that is less than the first threshold. The first set of activated rows and the second set of activated rows represent at least a portion of the multiple rows. For example, the secondary detection circuit 404 uses the comparator circuit 706-2 to compare the activation counts 712 associated with a second set of activated rows to the second threshold 726, as shown in FIGS. 7 and 8. The first set of activated rows and the second set of activated rows represent at least a portion of the multiple rows within the memory array 204. The first set of activated rows and the second set of activated rows can include one or more rows with a same row address or different row addresses. Rows associated with the first set of activated rows and the second set of activated rows are associated with different activation times.

Figure 12:
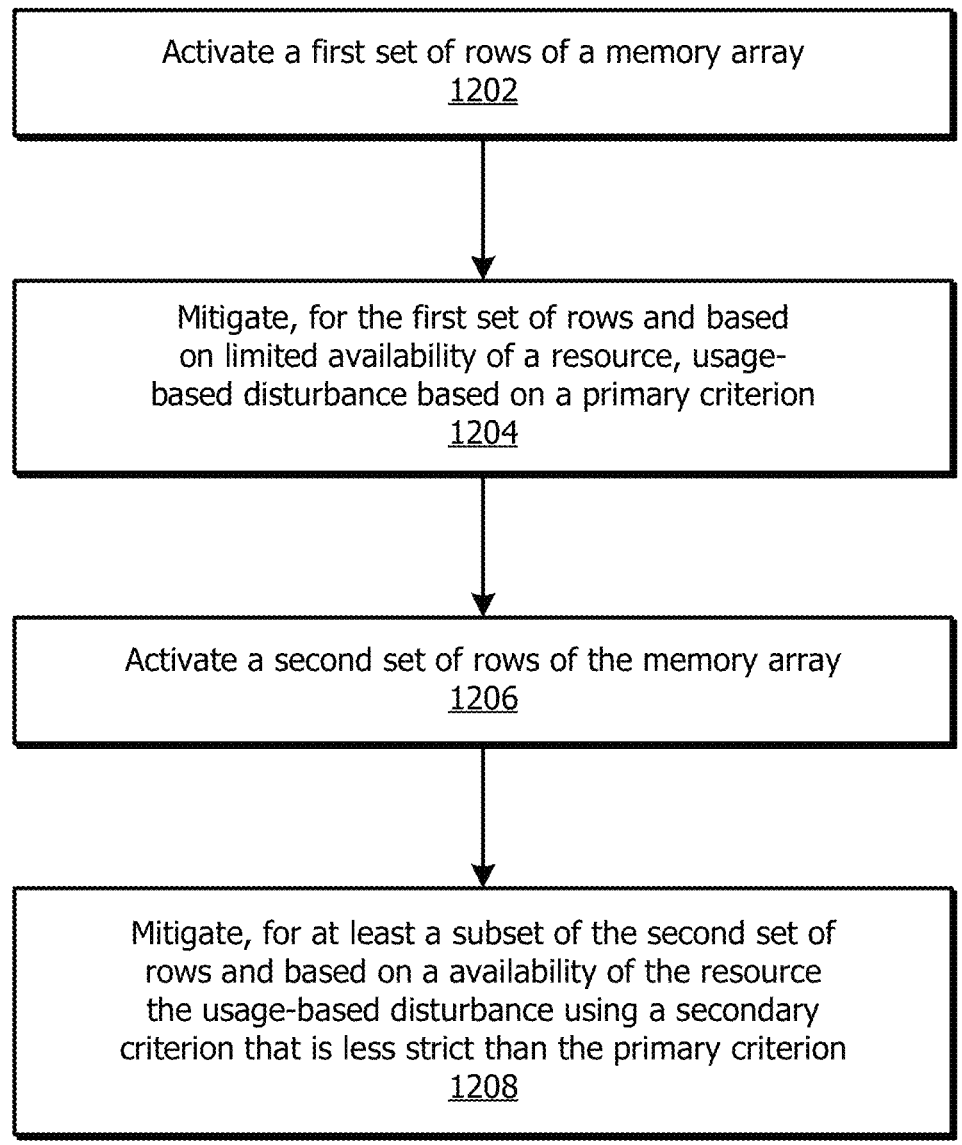
FIG. 12 illustrates a fourth example method of a memory device performing aspects of proactive usage-based disturbance mitigation based on resource availability.

FIG. 12 illustrates a method 1200, which includes operations 1202 through 1208. In aspects, operations of the method 1200 are implemented by a memory device 108 as described with reference to FIG. 1. At 1202, a first set of rows of a memory array are activated. For example, the memory device 108 activates the first set of rows of the memory array 204. The memory device 108 can activate the first set of rows based on activate commands received by the memory controller 114.

At 1204, usage-based disturbance is mitigated based on a primary criterion for the first set of rows and based on limited availability of a resource. For example, the usage-based disturbance circuitry 120 mitigates usage-based disturbance based on the primary criterion 408 for the first set of rows based on limited availability of the resource 412. The resource 412 can represent a memory resource or a timing resource. In some examples, the usage-based disturbance circuitry 120 explicitly determines the availability of the resource 412 based on an availability criterion 720, as described with respect to FIG. 7. In other examples, the usage-based disturbance circuitry 120 inherently determines that the availability of the resource 412 is limited based on the existence of entries within the primary queue 802, as described with respect to FIG. 8. The entries within the primary queue 802 can be associated with a higher priority than the entries within the secondary queue 804.

At 1206, a second set of rows of the memory array are activated. For example, the memory device 108 activates the second set of rows of the memory array 204. The memory device 108 can activate the second set of rows based on activate commands received by the memory controller 114.

At 1208, the usage-based disturbance is mitigated based on a secondary criterion for the second set of rows and based on availability of the resource. The secondary criterion is less strict than the primary criterion. For example, the usage-based disturbance circuitry 120 mitigates usage-based disturbance based on the secondary criterion 410 for the second set of rows and based on availability of the resource 412. The secondary criterion 410 is less strict than the primary criterion 408. By dynamically performing normal usage-based disturbance mitigation 122 based on a primary criterion 408 or proactive usage-based disturbance mitigation 124 based on a secondary criterion 410 depending on resource availability, the usage-based disturbance circuitry 120 can take proactive steps to prevent a denial-of-service situation when the resource is available or focus on high-risk conditions of usage-based disturbance if the resource is limited. In this way, the usage-based disturbance circuitry 120 can reduce the risk of a waterfall event causing the denial-of-service event.

For the figures described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 to 6, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Computer-readable media includes both non-transitory computer storage media and communication media including any medium that facilitates transfer of a computer program (e.g., an application) or data from one entity to another. Non-transitory computer storage media can be any available medium accessible by a computer, such as RAM, ROM, Flash, EEPROM, optical media, and magnetic media.

In the following, various examples for implementing aspects of proactive usage-based disturbance mitigation based on resource availability are described:

Example 1: A method performed by a memory device, the method comprising:
performing, for a first activated row, usage-based disturbance mitigation based on a primary criterion; and
performing, for a second activated row and based on an availability of a resource, the usage-based disturbance mitigation based on a secondary criterion that is less strict than the primary criterion.

Example 2: The method of example 1 or any other example, wherein the secondary criterion is less strict than the primary criterion such that a probability of an activated row satisfying the secondary criterion is greater than a probability of the activated row satisfying the primary criterion.

Example 3: The method of example 1 or any other example, wherein:
the performing of the usage-based disturbance mitigation based on the primary criterion comprises comparing an activation count of the first activated row to a first threshold associated with the primary criterion;
the performing of the usage-based disturbance mitigation based on the secondary criterion comprises comparing an activation count of the second activated row to a second threshold associated with the secondary criterion; and
the second threshold is less than the first threshold.

Example 4: The method of example 3 or any other example, wherein:
the performing of the usage-based disturbance mitigation based on the primary criterion comprises storing, within a first queue, a row address associated with the first activated row based on the activation count of the first activated row being greater than or equal to the first threshold; and the performing of the usage-based disturbance mitigation based on the secondary criterion comprises storing, within a second queue, a row address associated with the second activated row based on the activation count of the second activated row being greater than or equal to the second threshold.

Example 5: The method of example 4 or any other example, wherein:

the first queue and the second queue are a same queue; or the first queue and the second queue are different queues.

Example 6: The method of example 1 or any other example, wherein:

the performing of the usage-based disturbance mitigation based on the primary criterion comprises performing, for a first set of activated rows that include the first activated row, the usage-based disturbance mitigation based on the primary criterion; and the performing of the usage-based disturbance mitigation based on the secondary criterion comprises performing, for at least a subset of a second set of activated rows that include the second activated row, the usage-based disturbance mitigation based on the secondary criterion.

Example 7: The method of example 6 or any other example, wherein:

the subset of the second set of activated rows comprises a first subset; and the method further comprises:
performing, for a second subset of the second set of activated rows that do not include the first subset, the usage-based disturbance mitigation based on the primary criterion.

Example 8: The method of example 6 or any other example, wherein:

the subset of the second set of activated rows comprises a proper subset of the second set of activated rows; and the performing of the usage-based disturbance mitigation comprises:
performing the usage-based disturbance mitigation in a random, time-dependent, or activation-dependent manner as the second set of activated rows is activated.

Example 9: The method of example 1 or any other example, wherein:

the performing the usage-based disturbance mitigation based on the primary criterion comprises storing, within at least one queue, row addresses of activated rows that satisfy the primary criterion;

the method further comprises determining that the resource is available based on a level of fullness associated with the queue being less than a threshold; and the performing the usage-based disturbance mitigation based on the secondary criterion comprises performing the usage-based disturbance mitigation based on the level of fullness associated with the queue being less than the threshold.

Example 10: The method of example 9 or any other example, further comprising:

determining that the resource has limited availability based on the level of fullness associated with the queue being greater than another threshold, the other threshold being greater than the threshold; and performing, for a third activated row based on the determination that the resource has limited availability, the usage-based disturbance mitigation based on the primary criterion.

Example 11: An apparatus comprising:
a memory device comprising:
a memory array comprising multiple rows respectively configured to store activation counts that represent a quantity of times corresponding rows have been activated; and
circuitry coupled to the memory array, the circuitry comprising:
a first circuit configured to compare the activation counts associated with a first set of activated rows to a first threshold; and
a second circuit configured to compare the activation counts associated with a second set of activated rows to a second threshold that is less than the first threshold,
wherein the first set of activated rows and the second set of activated rows represent at least a portion of the multiple rows.

Example 12: The apparatus of example 11 or any other example, wherein the second circuit is configured to compare the activation counts associated with the second set of activated rows in a random, time-dependent, or activation-dependent manner such that the second set of activated rows correspond to rows that are activated in time in an interspersed manner with respect to activation of the first set of activated rows.

Example 13: The apparatus of example 11 or any other example, wherein the second circuit is configured to:
determine that a resource is available; and
compare the activation counts associated with the second set of activated rows to the second threshold based on the determination that the resource is available.

Example 14: The apparatus of example 11 or any other example, wherein:
the first circuit is configured to identify a subset of the first set of rows having activation counts that are greater than or equal to the first threshold;
the second circuit is configured to identify a subset of the second set of rows having activation counts that are greater than or equal to the second threshold; and
the circuitry comprises at least one queue configured to store row addresses corresponding to the subset of the first set of rows and the subset of the second set of rows.

Example 15: The apparatus of example 14 or any other example, wherein the at least one queue comprises:
a single queue configured to:
store the row addresses corresponding to the subset of the first set of rows and the subset of the second set of rows; and
output the row addresses in a first-in first-out manner.

Example 16: The apparatus of example 14 or any other example, wherein:
the at least one queue comprises:
a first queue configured to store the row addresses corresponding to the subset of the first set of rows; and a second queue configured to store the row addresses corresponding to at least one row of the subset of the second set of rows; and the first queue has a higher priority than the second queue.

Example 17: A method performed by a memory device, the method comprising:

activating a set of rows of a memory array;

mitigating, for a first subset of the set of rows, usage-based disturbance based on a primary criterion; and mitigating, for a second subset of the set of rows and based on an availability of a resource, the usage-based disturbance based on a secondary criterion that is less strict than the primary criterion.

Example 18: The method of example 17 or any other example, wherein:

the activating the set of rows comprises activating the set of rows in an order; and the activation of the first subset of the set of rows and the activation of the second subset of the set of rows are interspersed in time based on the order.

Example 19: The method of example 18 or any other example, wherein the mitigating of the usage-based disturbance based on the secondary criterion comprises randomly mitigating the usage-based disturbance based on the secondary criterion to cause the second subset of the set of rows to be interspersed in time with the first subset of the set of rows.

Example 20: The method of example 18 or any other example, wherein the mitigating of the usage-based disturbance based on the secondary criterion comprises mitigating the usage-based disturbance based on the secondary criterion in a time-dependent manner to cause the second subset of the set of rows to be interspersed in time with the first subset of the set of rows.

Example 21: The method of example 18 or any other example, wherein the mitigating of the usage-based disturbance based on the secondary criterion comprises mitigating the usage-based disturbance based on the secondary criterion in an activation-dependent manner to cause the second subset of the set of rows to be interspersed in time with the first subset of the set of rows.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Conclusion

Although aspects of implementing aspects of proactive usage-based disturbance mitigation based on resource availability have been described in language specific to certain features and/or methods, the subject of the appended claims is not necessarily limited to the specific features or methods described. Rather, the specific features and methods are disclosed as a variety of example implementations of implementing aspects of proactive usage-based disturbance mitigation based on resource availability.

What is claimed is:

1. A method performed by a memory device, the method comprising:

performing, for a first activated row of the memory device, usage-based disturbance mitigation based on a primary criterion; and performing, for a second activated row of the memory device and based on an availability of a resource, the usage-based disturbance mitigation based on a secondary criterion that is less strict than the primary criterion.

2. The method of claim 1, wherein the secondary criterion is less strict than the primary criterion such that a probability of an activated row satisfying the secondary criterion is greater than a probability of the activated row satisfying the primary criterion.

3. The method of claim 1, wherein:

the performing of the usage-based disturbance mitigation based on the primary criterion comprises comparing an activation count of the first activated row to a first threshold associated with the primary criterion;

the performing of the usage-based disturbance mitigation based on the secondary criterion comprises comparing an activation count of the second activated row to a second threshold associated with the secondary criterion; and the second threshold is less than the first threshold.

4. The method of claim 3, wherein:

the performing of the usage-based disturbance mitigation based on the primary criterion comprises storing, within a first queue, a row address associated with the first activated row based on the activation count of the first activated row being greater than or equal to the first threshold; and the performing of the usage-based disturbance mitigation based on the secondary criterion comprises storing, within a second queue, a row address associated with the second activated row based on the activation count of the second activated row being greater than or equal to the second threshold.

5. The method of claim 4, wherein:

the first queue and the second queue are a same queue; or
the first queue and the second queue are different queues.

6. The method of claim 1, wherein:

the performing of the usage-based disturbance mitigation based on the primary criterion comprises performing, for a first set of activated rows that include the first activated row, the usage-based disturbance mitigation based on the primary criterion; and the performing of the usage-based disturbance mitigation based on the secondary criterion comprises performing, for at least a subset of a second set of activated rows that include the second activated row, the usage-based disturbance mitigation based on the secondary criterion.

7. The method of claim 6, wherein:

the subset of the second set of activated rows comprises a first subset; and the method further comprises:

performing, for a second subset of the second set of activated rows that do not include the first subset, the usage-based disturbance mitigation based on the primary criterion.

8. The method of claim 6, wherein:
the subset of the second set of activated rows comprises a proper subset of the second set of activated rows; and
the performing of the usage-based disturbance mitigation comprises performing the usage-based disturbance mitigation in a random, time-dependent, or activation-dependent manner as the second set of activated rows is activated.

9. The method of claim 1, wherein:
the performing the usage-based disturbance mitigation based on the primary criterion comprises storing, within at least one queue, row addresses of activated rows that satisfy the primary criterion;
the method further comprises determining that the resource is available based on a level of fullness associated with the queue being less than a threshold; and
the performing the usage-based disturbance mitigation based on the secondary criterion comprises performing the usage-based disturbance mitigation based on the level of fullness associated with the queue being less than the threshold.

10. The method of claim 9, further comprising:
determining that the resource has limited availability based on the level of fullness associated with the queue being greater than another threshold, the other threshold being greater than the threshold; and
performing, for a third activated row based on the determination that the resource has limited availability, the usage-based disturbance mitigation based on the primary criterion.

11. An apparatus comprising:
a memory device comprising:
a memory array comprising multiple rows respectively configured to store activation counts that represent a quantity of times corresponding rows have been activated; and
circuitry coupled to the memory array, the circuitry comprising:
a first circuit configured to compare the activation counts associated with a first set of activated rows to a first threshold to detect a condition associated with usage-based disturbance; and
a second circuit configured to compare the activation counts associated with a second set of activated rows to a second threshold to detect another condition associated with the usage-based disturbance, the second threshold being less than the first threshold,
wherein the first set of activated rows and the second set of activated rows represent at least a portion of the multiple rows.

12. The apparatus of claim 11, wherein the second circuit is configured to compare the activation counts associated with the second set of activated rows in a random, time-dependent, or activation-dependent manner such that the second set of activated rows correspond to rows that are activated in time in an interspersed manner with respect to activation of the first set of activated rows.

13. The apparatus of claim 11, wherein the second circuit is configured to:

determine that a resource is available; and
compare the activation counts associated with the second set of activated rows to the second threshold based on the determination that the resource is available.

14. The apparatus of claim 11, wherein:
the first circuit is configured to identify a subset of the first set of rows having activation counts that are greater than or equal to the first threshold;
the second circuit is configured to identify a subset of the second set of rows having activation counts that are greater than or equal to the second threshold; and
the circuitry comprises at least one queue configured to store row addresses corresponding to the subset of the first set of rows and the subset of the second set of rows.

15. The apparatus of claim 14, wherein the at least one queue comprises a single queue configured to:
store the row addresses corresponding to the subset of the first set of rows and the subset of the second set of rows; and
output the row addresses in a first-in first-out manner.

16. The apparatus of claim 14, wherein:
the at least one queue comprises:
a first queue configured to store the row addresses corresponding to the subset of the first set of rows; and
a second queue configured to store the row addresses corresponding to at least one row of the subset of the second set of rows; and
the first queue has a higher priority than the second queue.

17. A method performed by a memory device, the method comprising:
activating a set of rows of a memory array;
mitigating, for a first subset of the set of rows, usage-based disturbance based on a primary criterion; and
mitigating, for a second subset of the set of rows and based on an availability of a resource, the usage-based disturbance based on a secondary criterion that is less strict than the primary criterion.

18. The method of claim 17, wherein:
the activating the set of rows comprises activating the set of rows in an order; and
the activation of the first subset of the set of rows and the activation of the second subset of the set of rows are interspersed in time based on the order.

19. The method of claim 18, wherein the mitigating of the usage-based disturbance based on the secondary criterion comprises randomly mitigating the usage-based disturbance based on the secondary criterion to cause the second subset of the set of rows to be interspersed in time with the first subset of the set of rows.

20. The method of claim 18, wherein the mitigating of the usage-based disturbance based on the secondary criterion comprises:
mitigating the usage-based disturbance based on the secondary criterion in a time-dependent manner to cause the second subset of the set of rows to be interspersed in time with the first subset of the set of rows; or
mitigating the usage-based disturbance based on the secondary criterion in an activation-dependent manner to cause the second subset of the set of rows to be interspersed in time with the first subset of the set of rows.

* * * * *